United States Patent [19]

Shima et al.

[11] Patent Number: 5,587,758
[45] Date of Patent: Dec. 24, 1996

[54] PHOTO-DEVELOPING APPARATUS

[75] Inventors: Kazunobu Shima; Yuji Yamamoto, both of Wakayama, Japan

[73] Assignee: Noritsu Koki Co., Ltd., Wakayama-ken, Japan

[21] Appl. No.: 544,533

[22] Filed: Oct. 18, 1995

[30] Foreign Application Priority Data

Oct. 19, 1994 [JP] Japan .................................. 6-253659
Jan. 10, 1995 [JP] Japan .................................. 7-002175
Sep. 6, 1995 [JP] Japan .................................. 7-229244

[51] Int. Cl.$^6$ ............................. G03D 3/08; G03D 13/00
[52] U.S. Cl. ........................................ 396/613; 396/615
[58] Field of Search ........................... 354/298, 310–315, 354/319–321; 355/206, 308, 75, 77, 209, 208; 271/225, 227, 185, 184, 176, 270, 202

[56] References Cited

U.S. PATENT DOCUMENTS 5,274,418 12/1993 Kazami et al. .......................... 355/40
5,320,340 6/1994 Bay ........................................ 271/225
5,400,096 3/1995 Kamada et al. .................... 354/319 X Primary Examiner—D. Rutledge
Attorney, Agent, or Firm—Wenderoth, Lind & Ponack

[57] ABSTRACT

A photo-developing apparatus comprises direction switching means in a transfer passage shifting a sheet paper to a developing unit from a printing unit and is disposed for rotating the sheet paper sent from the printing unit to change its direction within the range from 70 degree to 110 degree or from 250 degree to 290 degree.

28 Claims, 17 Drawing Sheets

PHOTO-DEVELOPING APPARATUS

FIELD OF THE INVENTION

The present invention relates to a photo-developing apparatus, and particularly to a photo-developing apparatus which changes the transferring direction of printed sheet paper and supplies it to a developing unit automatically.

BACKGROUND OF THE INVENTION

In the case of developing photographs in a photodeveloping apparatus, it is more effective to supply sheet paper printed in a printing unit to a developing unit with its short-side direction directing to the transferring direction.

In the case of panoramic-size sheet paper, however, when the sheet paper is supplied to the developing unit with its short-side direction directing to the transferring direction, a width of the developing unit becomes considerably large.

Therefore, as to the panoramic-size sheet paper, an apparatus in which the sheet paper is exchanged and the transferring direction of a negative film is changed for printing in the printing unit, or an apparatus in which, in place of changing the transferring direction of the negative film, the direction of the printed service-size sheet paper is changed in the printing unit and supplied to the developing unit has been proposed.

In the above-mentioned apparatus, such problems were encountered that, (1) processing of a panoramic print requires a paper exchange and the like, which results in a poor workability, (2) since the normal and panoramic-size negative films are processed automatically, an automatic exchanging mechanism and a film rotating mechanism for several kinds of paper are required, which results in a complicated and expensive apparatus, (3) furthermore, since the next printing is suspended while rotating the negative films, the printing capacity is deteriorated.

Also, in the latter case, since the next printing of the sheet paper is not possible until the sheet paper has been rotated, the printing capacity is deteriorated.

The present invention has been devised in view of the afore-mentioned problems, therefore, it is an object thereof to provide a photo-developing apparatus capable of improving the printing and developing capability as well as minimizing the apparatus.

SUMMARY OF THE INVENTION

A photo-developing apparatus of the present invention is so constituted that, a rolled-paper pulled out from a magazine is cut into a desired length, which is printed in a printing unit and developed in a developing unit, in a transfer passage shifting the sheet paper to the developing unit from the printing unit, direction switching means being disposed for rotating the sheet paper sent from the printing unit to change its direction within the range from 70 degree to 110 degree or from 250 degree to 290 degree.

The photo-developing apparatus comprises control means for judging whether or not to actuate the direction switching means depending upon sizes of the sheet paper.

The photo-developing apparatus comprises, when the sheet paper is a panoramic size, control means for controlling the direction switching means so as to transfer the sheet paper with its long-side direction directing to the transferring direction without actuating the direction switching means.

The control means of the photo-developing apparatus includes, detecting means for detecting the sheet paper size, and judging means for judging a detecting signal outputted from the detecting means to output a control signal to the direction switching means.

The control means of the photo-developing apparatus includes, a memory for storing a cutting size instruction signal of the rolled paper as size information, and judging means for judging the size information outputted from the memory to output a control signal to the direction switching means.

The direction switching means of the photo-developing apparatus includes, a pair of upper and lower rotating disks pressing and clamping the sheet paper therebetween, rotating means for rotating the pair of upper and lower rotating disks to change the direction of sheet paper and means for releasing the transferring means during the rotation.

The direction switching means of the photo-developing apparatus includes, suction means for sucking the sheet paper, rotating means for rotating the suction means to change the direction of sheet paper and means for transferring the sheet paper together with the suction means and the rotating means.

The direction switching means of the photo-developing apparatus includes, a pair of upper and lower driving and pressing rollers which transfer the sheet paper, and rotating means for rotating the pair of upper and lower driving and pressing rollers to change the direction of sheet paper.

According to the photo-developing apparatus of the present invention, first, after cutting the rolled paper pulled out from the magazine into a desired length, the sheet paper is printed in the printing unit.

Then, as to a service-size paper among the printed sheet paper, the direction of sheet paper is changed within the range from 70 degree to 110 degree or from 250 degree to 290 degree as rotating the sheet paper.

Thereby, the sheet paper is tilted with respect to the transferring direction of the paper and transferred to the developing unit in the state where its length from the front to rear ends is shorter than a long-side direction thereof.

Meanwhile, as to a panoramic-size paper among the printed sheet paper, which is supplied to the developing unit for development with the long-side direction of the sheet paper directing to the transferring direction without actuating the direction switching means.

DETAILED DESCRIPTION OF THE PREFERRED EMBODIMENTS

First Embodiment

Figure 1:
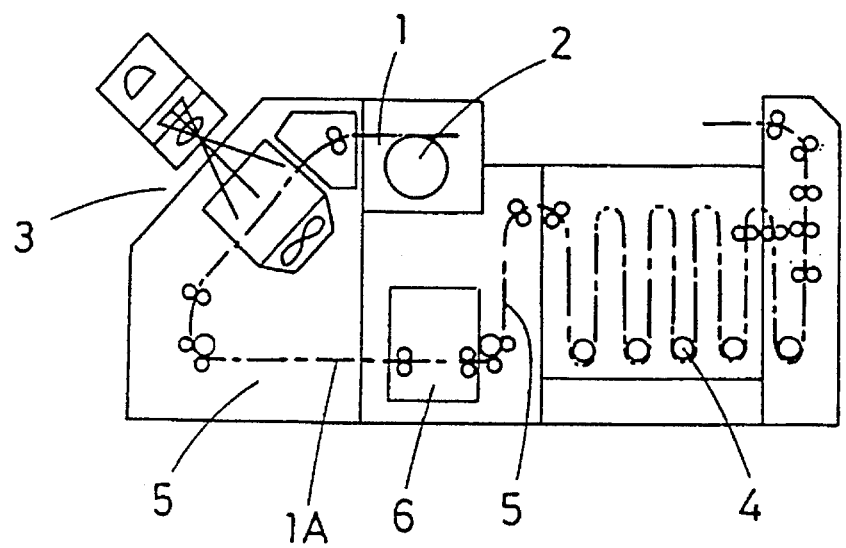
FIG. 1 is a schematic view showing a first embodiment of a photo-developing apparatus of the present invention.

FIG. 1 shows a schematic view of a photo-developing apparatus comprising, a magazine 2 containing rolled paper 1 (printing paper), a printing unit 3, a developing unit 4 and direction switching means 6 disposed in a transfer passage 5 between the printing unit 3 and the developing unit 4.

The rolled paper 1 pulled out from the magazine 2 is cut into a desired size before being transferred to the printing unit 3, the cut sheet paper 1A is transferred to the printing unit 3 with its long-side direction directing to the transferring direction. There are a service-size paper and a panoramic-size paper in the sheet paper 1A, and in the case of service-size sheet paper 1A, assuming that, for example, a width of the rolled paper 1 is respectively 120 mm, 127 mm and 152 mm, they are cut into the length of 82 mm, 89 mm and 102 mm, and that a width of the rolled paper 1 is respectively 82 mm, 89 mm, and 102 mm, they are cut into the length of 120 mm, 127 mm, 152 mm. In the case of panoramic-size sheet paper 1A, assuming that, for example, a width of the rolled paper 1 is respectively 89 mm, 102 mm and 127 mm, they are cut into the length of 254 mm, 305 mm and 350 mm.

The direction switching means 6 is designed to rotate the printed sheet paper 1A sent from the printing unit 3 at an angle of 90 degree and supply it to the developing unit 4 in the transverse state. The direction switching means 6 is consisting of a pair of upper and lower rotating disks 61, 62 and rotating means 63 for rotating the pair of upper and lower rotating disks 61, 62 to change the direction of the sheet paper 1A (FIG. 5 through FIG. 7).

The direction switching means 6 is controlled by control means 7 to be described later.

Figure 5:
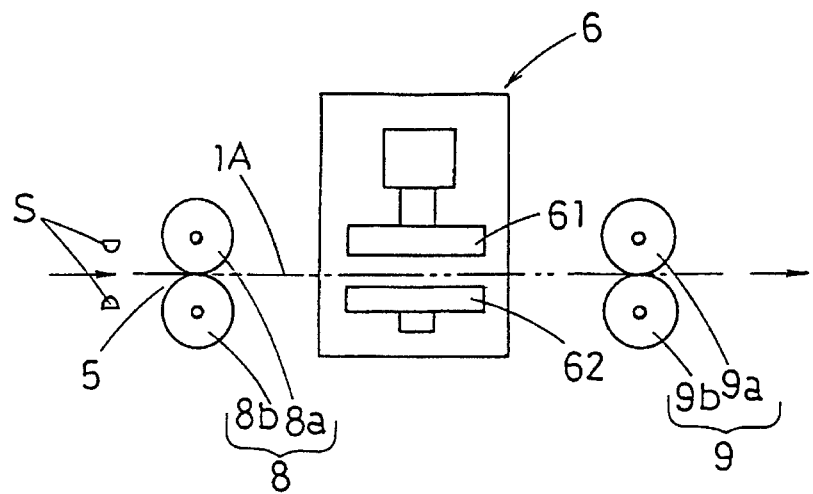
FIG. 5 is a schematic view of direction switching means of the first embodiment.
Figure 6:
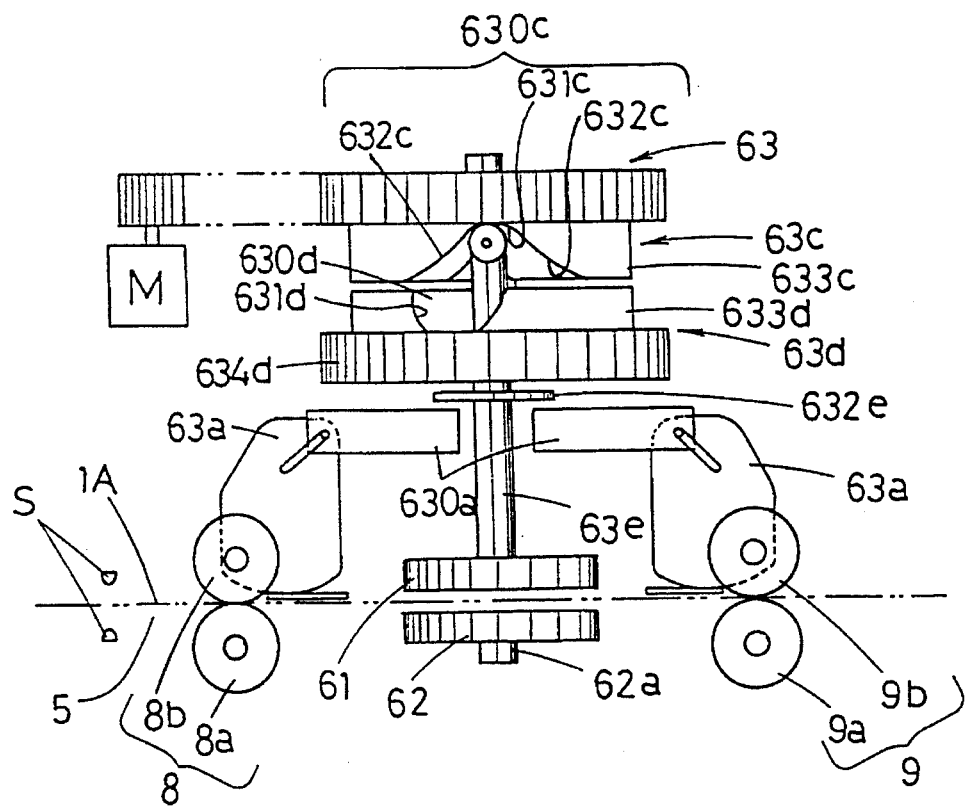
FIG. 6 is a front view of the direction switching means of the same embodiment.
Figure 7:
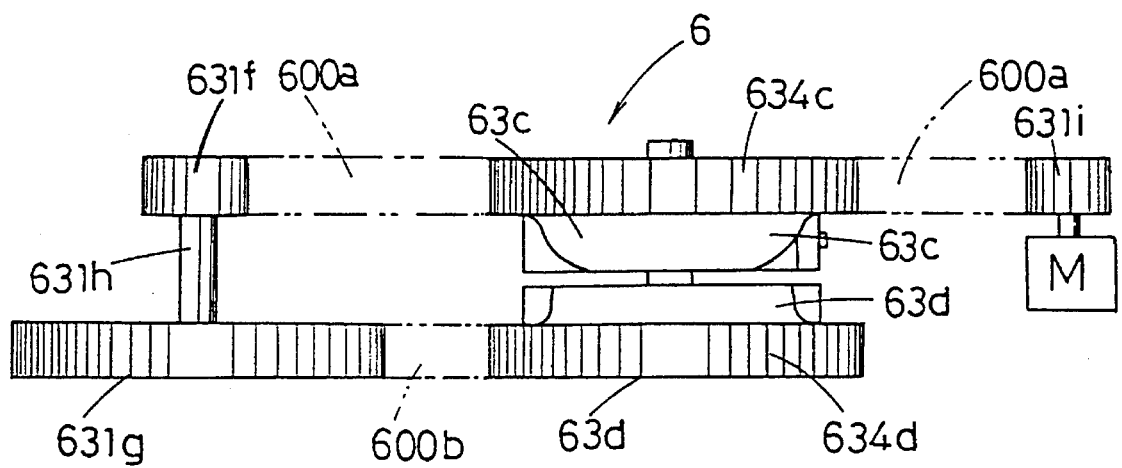
FIG. 7 is a view showing a transmission mechanism of the direction switching means of the same embodiment.

The direction switching means 6 includes, a pair of rollers 8 constituted by a driving roller 8b and a pressing roller 8a for receiving the sheet paper 1A from the printing unit 3, and a pair rollers 9 constituted by a driving roller 9b and a pressing roller 9a for supplying the sheet paper 1A to the developing unit 4 (FIG. 5 and FIG. 6).

The rotating disks 61, 62 are disposed as facing one another via the transfer passage 5, the rotating disk 62 being mounted to a rotary shaft 62a born by bearings, the rotating disk 61 being mounted to a lower end of an operating shaft 63e of rotating means 63, and rotating centers of the rotating disks 61, 62 being positioned on a same vertical line (FIG. 6).

The rotating means 63 is designed to ascend, descend and rotate the operating shaft 63e by a cam mechanism (cams 63b, 63c, 63d).

Figure 8:
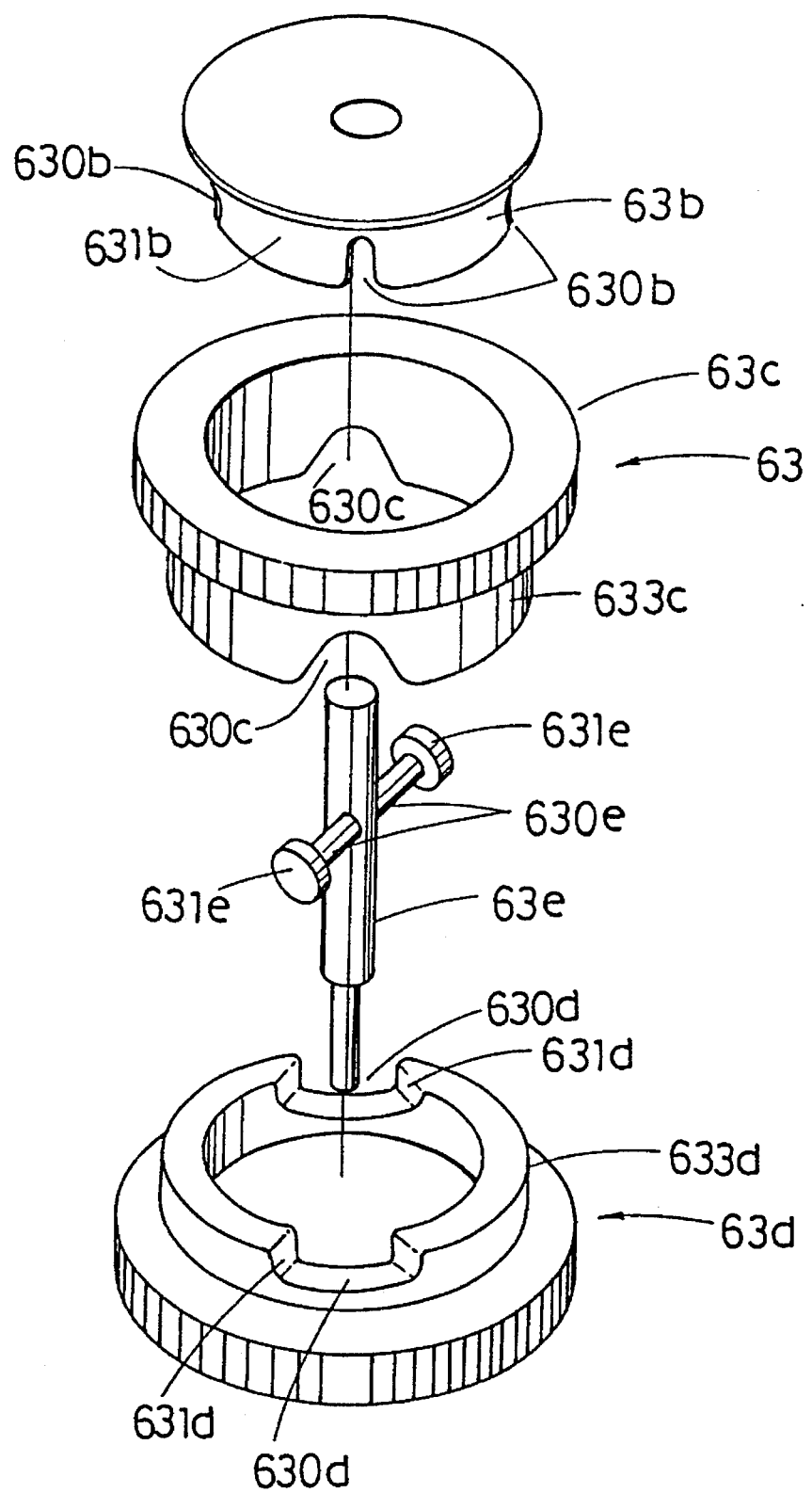
FIG. 8 is an exploded perspective view of the direction switching means of the same embodiment.

From an intermediate portion of the operating shaft 63e, horizontal shafts 630e are projecting toward both sides, on tips of which rollers 631e are fixed (FIG. 6 and FIG. 8).

The rollers 631e of the operating shaft 63e are elastically urged upward by an elastic body (not shown).

An operating plate 632c is fixed to the intermediate portion of the operating shaft 63e (FIG. 6).

A positioning cam 63b is constituted by four positioning grooves 630b disposed, at a distance of 90 degree, around lower edges of a ring portion 631b.

The positioning cam 63b has its rotation restricted by being fixed to a support frame (not shown).

An ascending and descending cam 63c is constituted by two cam grooves 630c disposed, at a distance of 180 degree, around lower edges of the ring portion 633c, the cam grooves 630c being formed by providing cam faces 632c on both sides of a root portion 631c.

A grooved pulley 634c is formed at upper edges of the ring portion 633c of the ascending and descending cam 63c.

A rotating cam 63d is constituted by two cam grooves 630d disposed, at a distance of 180 degree, around upper edges of the ring portion 633d, a diameter of the ring portion 633d being set as same as that of the ring portion 633c of the ascending and descending cam 63c.

On the rear side in the rotating direction of the cam grooves 630d of the rotating cam 63d, roller stoppers 631d are formed, and a width of the cam groove 630d is set longer, by 30 degree in the rotating direction, than a width of the cam groove 630c of the ascending and descending cam 63c.

A grooved pulley 634d is formed at lower edges of the ring portion 633d of the rotating cam 63d.

Numeral 63a designates roller releasing cams mounted swingably in both directions at both sides of an ascending and descending body 530a which ascends and descends along the operating shaft 63e, pressing rollers 8b, 9b being fixed to tips of the roller releasing cams 63a and the ascending and descending body 630a being elastically urged upward by an elastic body (not shown) to contact to the lower face of the operating plate 632e of the operating shaft 63e elastically.

In a state where the ascending and descending body 630a is elastically urged and ascended, the pressing rollers 8b, 9b are moved downward by the cam 63a to clamp the sheet paper 1A between the pressing rollers 8a, 9a.

Meanwhile, in a state where the ascending and descending body 630a is descended by the operating plate 632e of the operating shaft 63e against the elastical urging force, the pressing rollers 8b, 9b are moved upward by the roller releasing cams 63a to release clamping of the sheet paper 1A.

FIG. 7 shows a rotating mechanism for interlocking the cams 63c, 63d and constituted by grooved pulleys 634c, 634d, 631i, 631f, 631g and timing belts 600a, 600b stretched between the pulleys, whereby the cams 63c, 63d are rotated in the same direction by the rotating mechanism and a motor M, and the rotating cam 63d is rotated at the speed of three times the ascending and descending cam 63c.

The grooved pulleys 631f, 631g are fixed to opposite ends of a rotating shaft 631h born by bearings (not shown).

Figure 9:
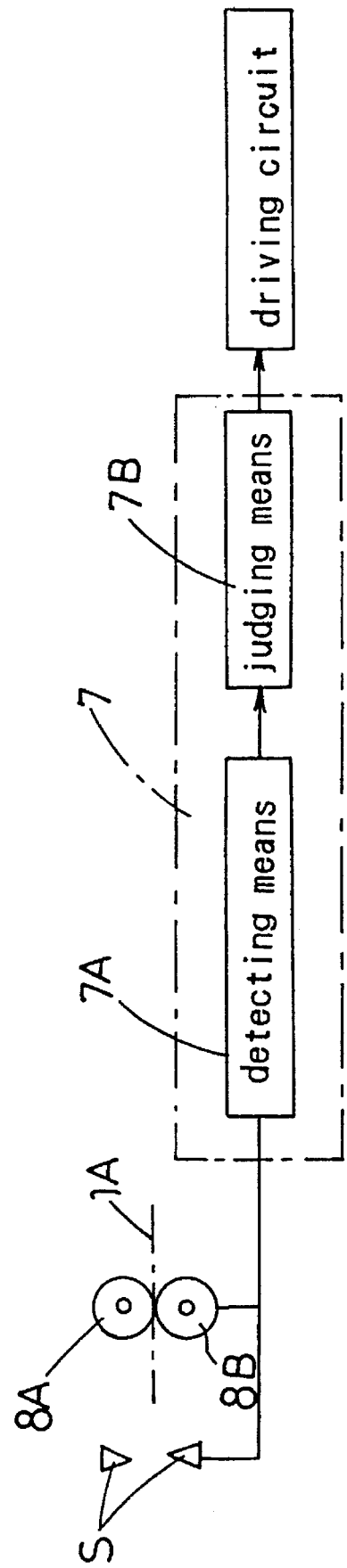
FIG. 9 is a block diagram showing control means of the direction switching means of the same embodiment.

Control means 7 is constituted by detecting means 7A for detecting the size of sheet paper 1A and judging means 7B for judging a detecting signal outputted from the detecting means 7A to output a control signal to the direction switching means 6 (FIG. 9).

The detecting means 7A is designed to detect a feed length of the sheet paper 1A to decide the rotation. That is, as shown in FIG. 5, by detecting a rotating angle of the drive roller 8b from detecting a front end of the sheet paper 1A till detecting a rear end thereof, the feed length of the sheet paper 1A is calculated to judge whether the long-side direction or the short-side direction is the transferring direction.

Figure 2:
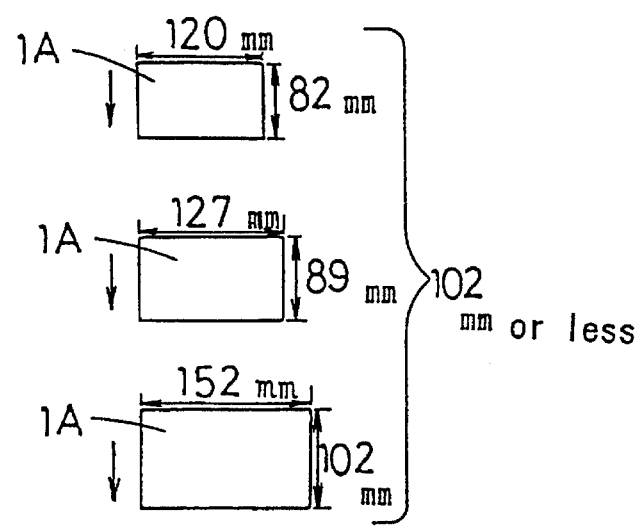
FIG. 2 through FIG. 4 are plan views showing transferring directions of sheet paper.

When the calculated feed length is 102 mm or less, it is judged that the sheet paper 1A is a service size shown in FIG. 2 and is transferred with its short-side direction directing to the transferring direction, and the sheet paper 1A is transferred to the developing unit 4 without changing its direction by the direction switching means 6.

When the calculated feed length is above 103 mm and below 153 mm, it is judged that the sheet paper 1A is service size shown in FIG. 3 and is transferred with its long-side direction directing to the transferring direction, and an actuating instruction signal is outputted to a driving circuit of the direction switching means 5, which changes the direction at an angle of 90 degree by rotating the sheet paper 1A to transfer it to the developing unit with its short-side direction directing to the transferring direction.

Figure 4:
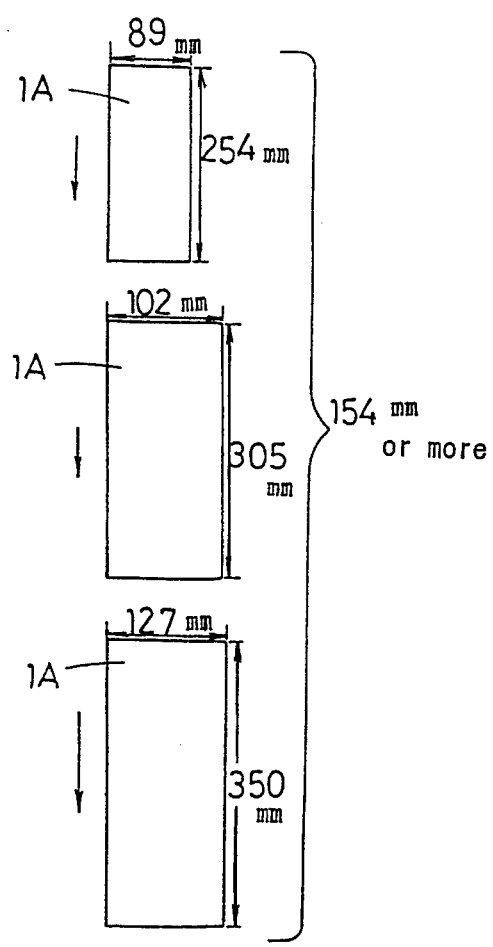

Furthermore, when the calculated feed length is 154 mm or more, it is judged that the sheet paper 1A is a panoramic size shown in FIG. 4, and the sheet paper 1A is transferred to the developing unit 4 without changing its direction by the direction switching means 6.

Figure 3:
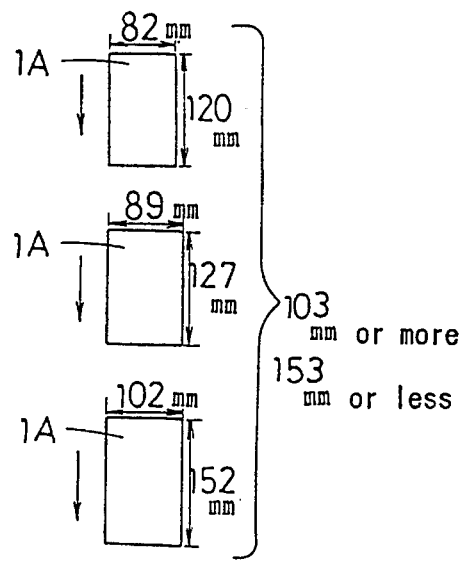

Arrows shown in FIG. 2 through FIG. 4 indicate the transferring direction of the printed sheet paper 1A transferred from the printing unit 3.

Next, the rotating operation of the sheet paper 1A by the direction switching means 6 is described in detail.

(1) First, the printed sheet paper 1A is detected by the paper sensor S, when the detecting means 7A of the control means 7 decide to change the direction of the sheet paper 1A, by controlling the rotating angle of the driving roller 8b, the sheet paper 1A is transferred by the pair of rollers 8, 9 until its center coincides with the rotating center of the rotating disks 61, 62 of the direction switching means 6.

Figure 11:
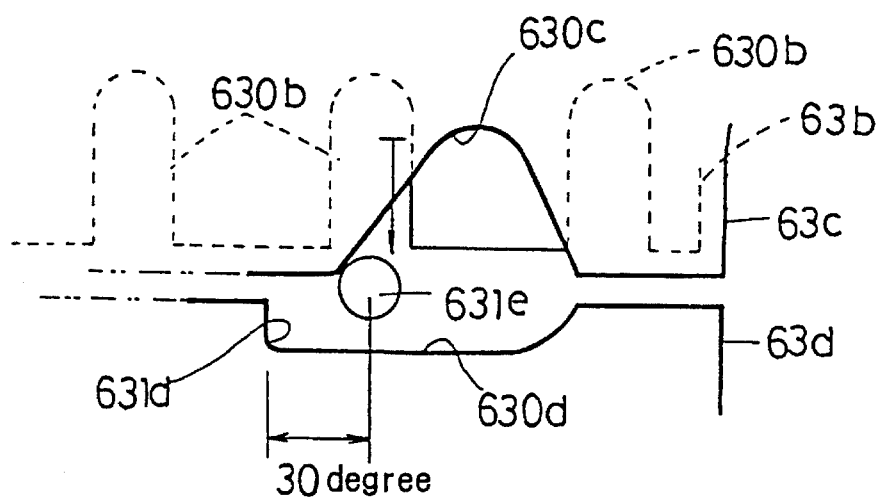

(2) When the motor M is driven by the actuation instruction signal from the detecting means 7A of the control means 7, the ascending and descending cam 63c and the rotating cam 63d are rotated in the same direction and the rollers 631e of the operating shaft 63e are moved downward, thereby the pressing state by the pressing rollers 8b, 9b is released and the rotating disk 61 is descended to press and clamp the sheet paper 1A between the rotating disk 62 (FIG. 11).

Figure 10:
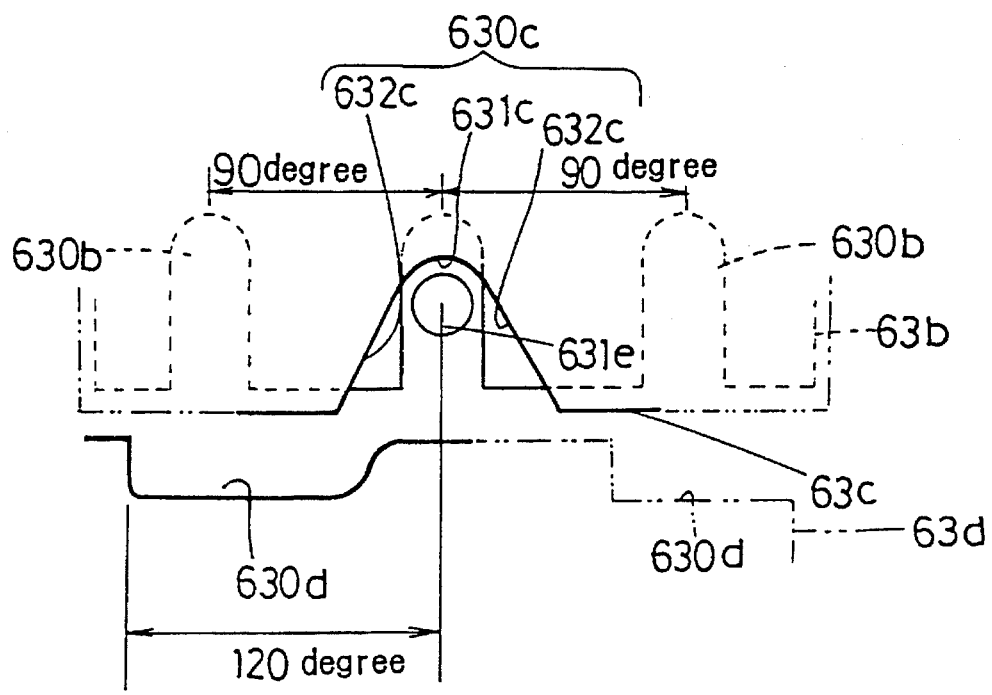
FIG. 10 through FIG. 13 are views explaining the operation of the direction switching means of the same embodiment.

FIG. 10 shows relative positions of the cams 63b, 63c, 63d before starting the operation, wherein considering that the rotating speed of the rotating cam 63d is three times the rotating speed of the ascending and descending cam 63c, the rotating cam 63d is shifted backward from the ascending and descending cam 63c at an angle of 120 degree.

Figure 12:
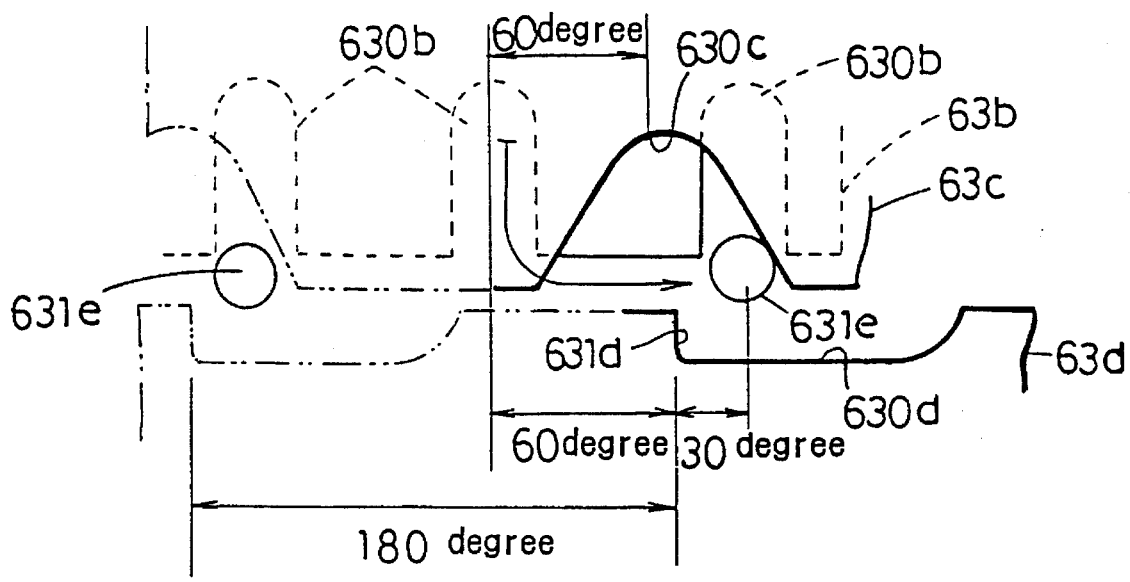
Figure 13:
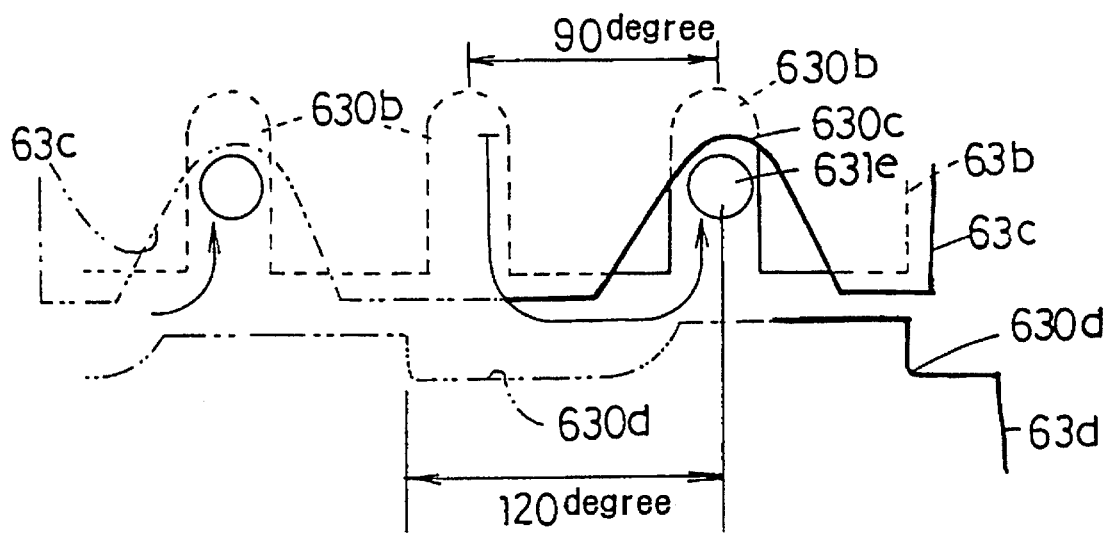

(3) Then, the rollers 631e rotate together with the rotating cam 63d while engaging to the cam grooves 630d of the rotating cam 63d (FIG. 12).

At this time, since the rotating cam 63d is rotated at the speed of three times the ascending and descending cam 63c, the cam grooves 630d of the rotating cam 63d pass the cam grooves 630c of the ascending and descending cam 63c, thereby the rollers 631e reach the adjacent positioning grooves 630b of positioning cam 63b faster than the root portion 631c of the cam grooves 630c of the ascending and descending cam 63c.

(4) Next, when the root portion 630c of the cam grooves 630c of the ascending and descending cam 63c catches up with the rollers 531e, which engage to the adjacent positioning grooves 630b of the positioning cam 63b.

Since the rotating disks 61, 62 are positioned at the time point of rotating at an angle of 90 degree as such, the sheet paper 1A can be oriented at an angle of 90 degree.

Since the rotating disk 61 is ascended when the sheet paper 1A has been oriented at an angle of 90 degree, the clamping state of the sheet paper 1A by the rotating disks 61, 62 is released and the sheet paper 1A is pressed and clamped by the pair of rollers 8, 9.

When the driving rollers 8a, 9a are driven at this state, the sheet paper 1A is supplied to the developing unit 4 in the transverse state.

Figure 14:
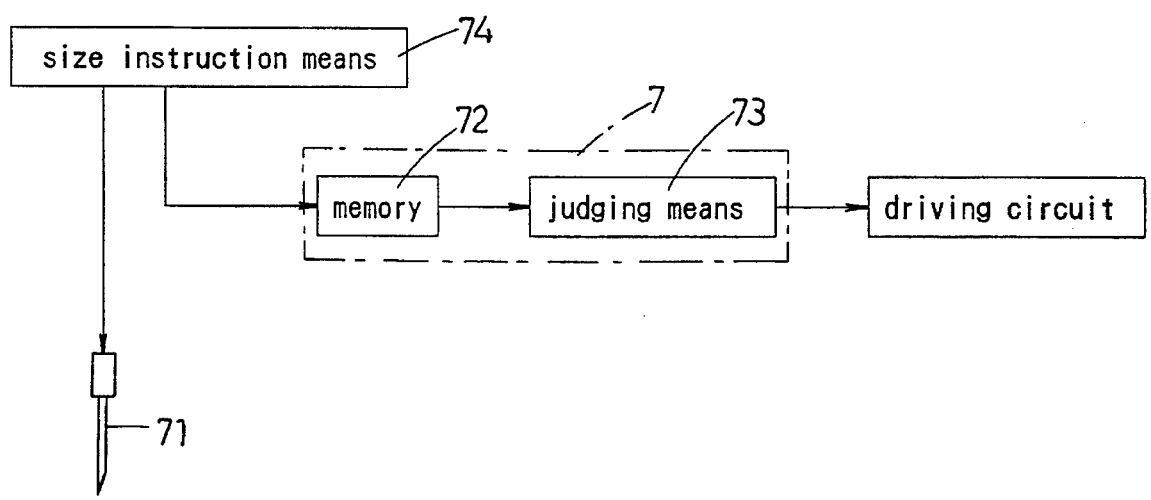
FIG. 14 is a block diagram showing another example of control means of the direction switching means of the same embodiment.

FIG. 14 shows another example of the control means constituted by a memory 72 storing a cut size instruction signal as size information for cutting the rolled paper 1 by a cutter 71, and judging means 73 for judging the size information for every frames outputted subsequently from the memory 72 to output a control signal to the driving circuit of the direction switching means 6.

The cut size instruction signal is consisting of a selecting signal of a width of rolled sensitive materials and a designating signal of a cut length of the rolled sensitive materials and is outputted from size instruction means 74 such as a scanner and the like.

Second Embodiment

A photo-printing apparatus employs a same configuration as the first embodiment as to the magazine, printing unit and developing unit, and the direction switching means 6 disposed in a transfer passage between the printing unit and developing unit employs a same configuration as the first embodiment except the rotating means 63.

The direction switching means 6 is also controlled by the control means as same as the first embodiment.

Figure 15:
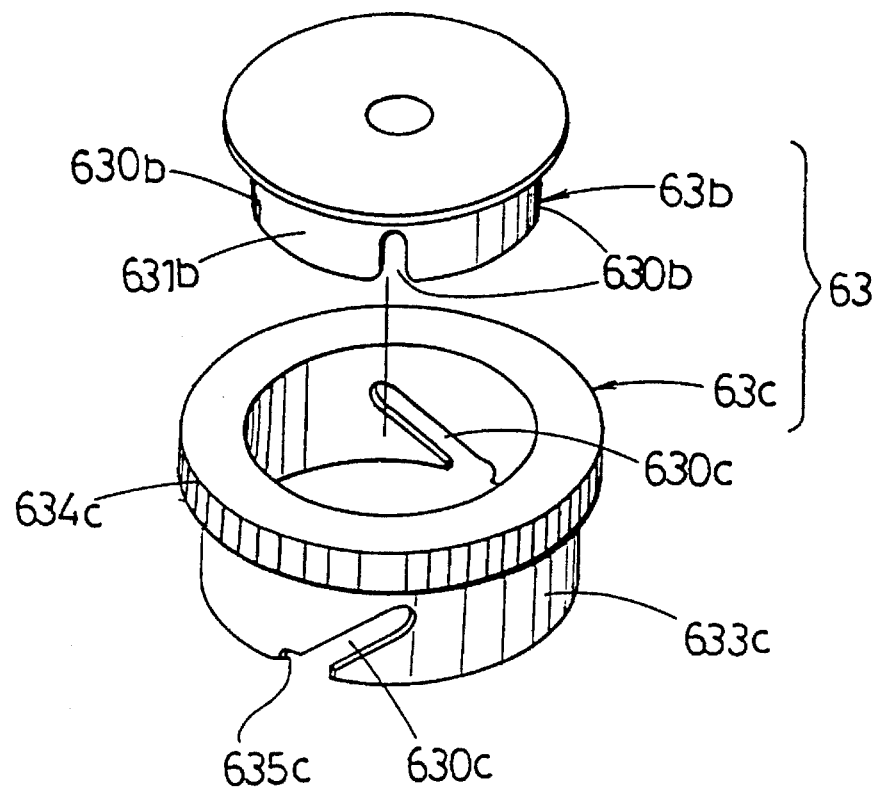
FIG. 15 is an exploded perspective view showing a second embodiment of a photo-developing apparatus of the present invention.
Figure 16:
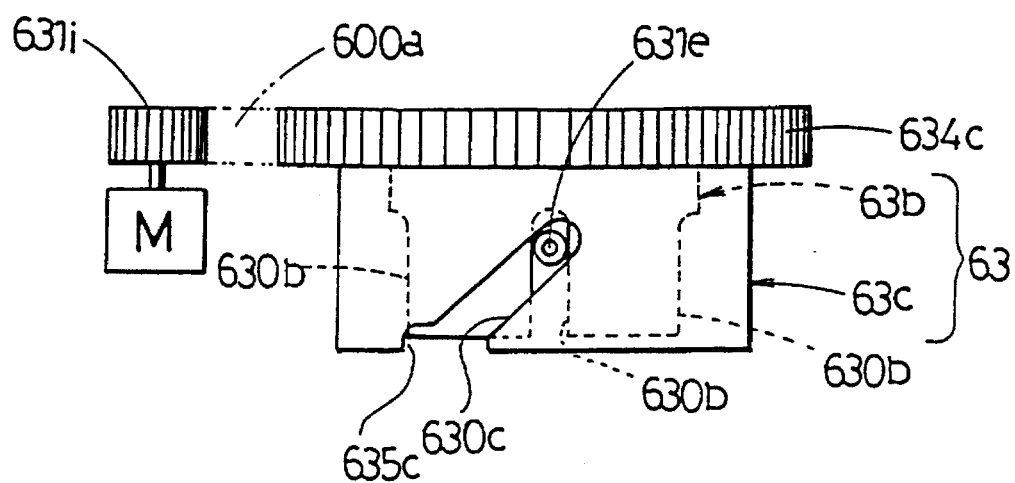
FIG. 16 is a front view of direction switching means of the same embodiment.

FIG. 15 and FIG. 16 show the rotating means 63 for ascending, descending and rotating the operating shaft 63e by a cam mechanism (cams 63b, 63c).

The positioning cam 63b is constituted by four positioning grooves 630b disposed around lower edges of the ring portion at an angle of 90 degree.

The positioning cam 63b has its rotation restricted by being fixed to a support frame (not shown).

The ascending and descending cam 63c is constituted by two cam groove 630c disposed around the ring portion 633c at a distance of 180 degree, the cam grooves 630c are formed obliquely upward from lower edges of the ring portion 633c and roller stopper 635c are formed at lower ends of the cam grooves 630c.

A grooved pulley 634c is formed at upper edges of the ring portion 633c of the ascending and descending cam 63c.

As shown in FIG. 6, a rotating mechanism of the ascending and descending cam 63c is constituted by the grooved pulley 634c, a grooved pulley 631i on the side of a motor M and a belt 600a stretched between the pulleys 634c, 631i. The ascending and descending cam 63c is rotated in the normal and reverse direction by the normal and reverse rotation of the rotating mechanism and the motor M.

Next, the rotating operation of the sheet paper by the direction switching means 6 is described.

(1) First, as described in the first embodiment, when the printed sheet paper is detected by the sensor and the detecting means of the control means decides to change the direction of the sheet paper, by controlling the rotating angle of the driving roller, the sheet paper is transferred by the pair of rollers until its center coincides with the rotating center of the rotating disks of the direction switching means.

Figure 17:
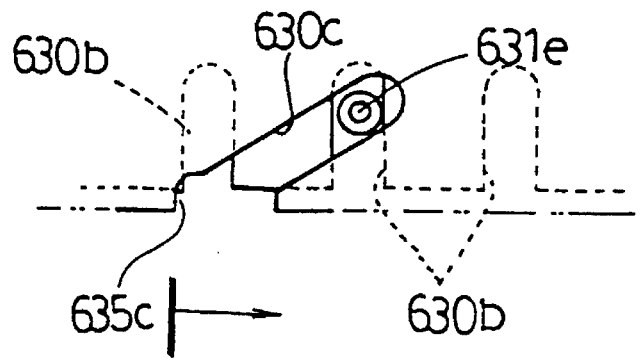
FIG. 17 through FIG. 20 are views for explaining the operation of the direction switching means of the same embodiment.

FIG. 17 shows relative positions of the cams 63b, 63c before starting the operation.

Figure 18:
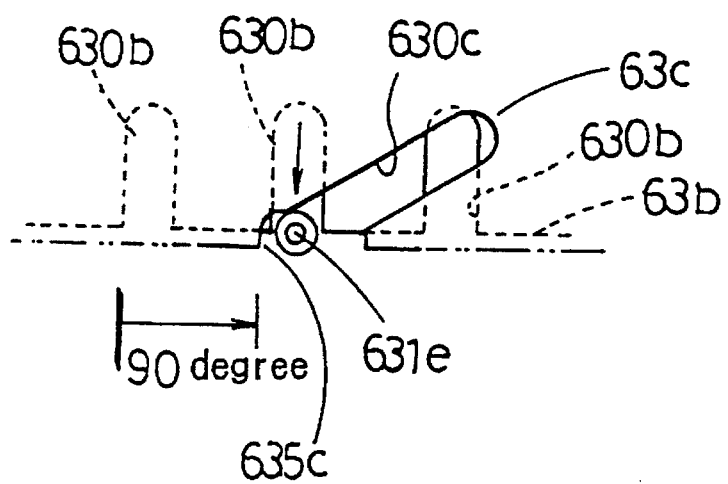

(2) When the motor M is driven in the normal direction by the actuation instruction signal from the detecting means of the control means to rotate the ascending and descending cam 63s at an angle of 90 degree, the rollers 631e of the operating shaft are moved downward along the cam grooves 630c of the ascending and descending cam 63c (FIG. 18), thereby the sheet paper is released from the pressing roller and pressed and clamped by the rotating disks.

Figure 19:
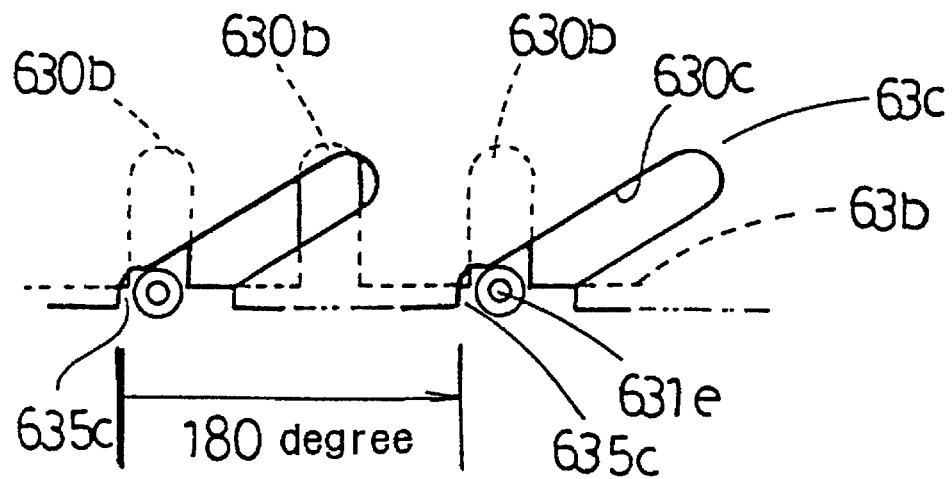

(3) When the ascending and descending cam 63c is rotated further at an angle of 90 degree, the rollers 631e of the operating shaft engage to the roller stoppers 635c of the cam grooves 630c of the ascending and descending cam 63c to move at an angle of 90 degree (FIG. 19), thereby the sheet paper pressed and clamped between the rotating disks is rotated at an angle of 90 degree.

Figure 20:
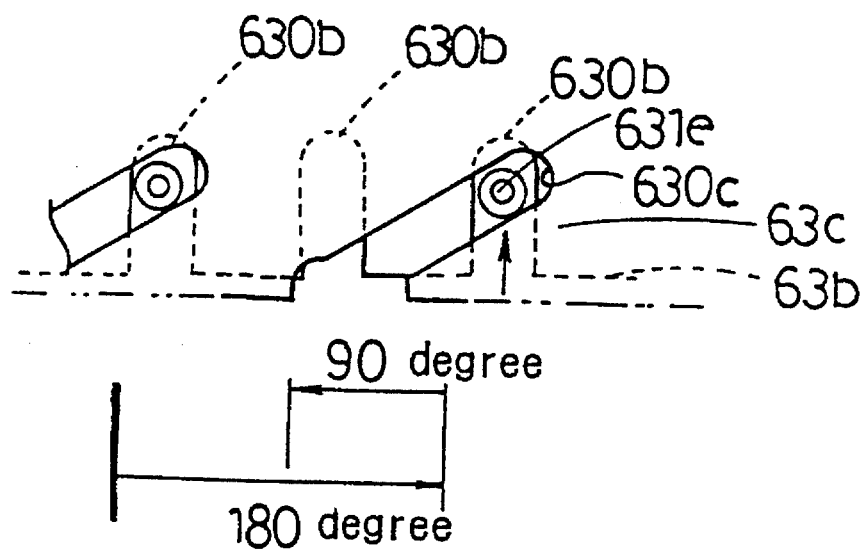

(4) Next, when the ascending and descending cam 63c is rotated in the reverse direction at an angle of 90 degree, the rollers 631e of the operating shaft are ascended by the cam grooves 630c of the ascending and descending cam 63c and engage to the positioning groove 630b adjacent to the positioning groove 630b of the positioning cam 63b to which it has been engaged before starting the operation (FIG. 20).

Thereby, as same as the first embodiment, the clamping state of the sheet paper by the rotating disks is released and the sheet paper is pressed and clamped between the pair of rollers.

When the driving roller is driven at this state, the sheet paper 1A is supplied to the developing unit 4 in the transverse state.

As such, in the second embodiment, the rotating cam 63d employed in the first embodiment is deleted, a shape of the cam grooves 630c of the ascending and descending cam 63c is changed and the reverse operation of the ascending and descending cam 63c is added, thereby structures of the rotating means of the sheet paper is simplified as compared with the first embodiment.

Third Embodiment

A photo-printing apparatus employs a same configuration as the first embodiment as to the magazine, printing unit and developing unit, and the direction switching means 6 disposed in a transfer passage between the printing unit and the developing unit employs configuration shown in FIG. 21 through FIG. 24.

Figure 21:
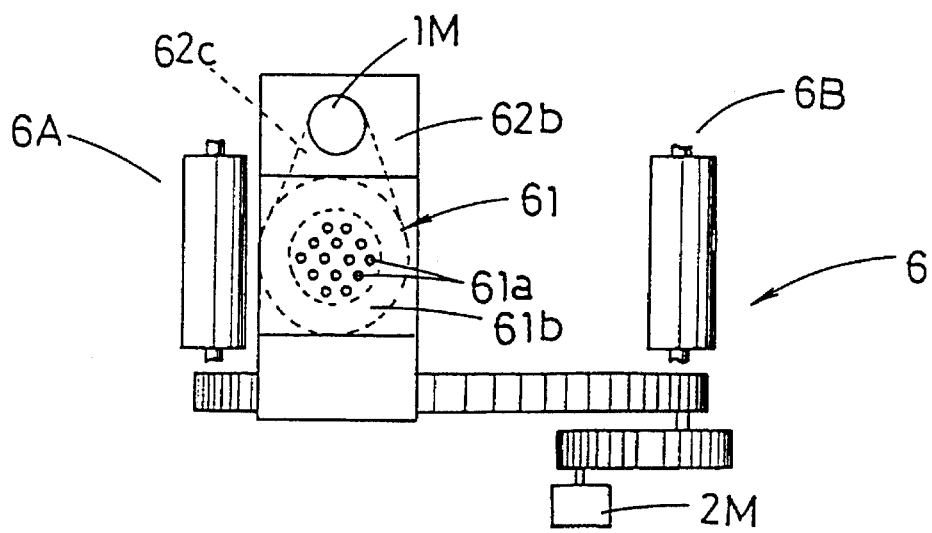
FIG. 21 is a plan view showing a third embodiment of a photo-developing apparatus of the present invention.
Figure 22:
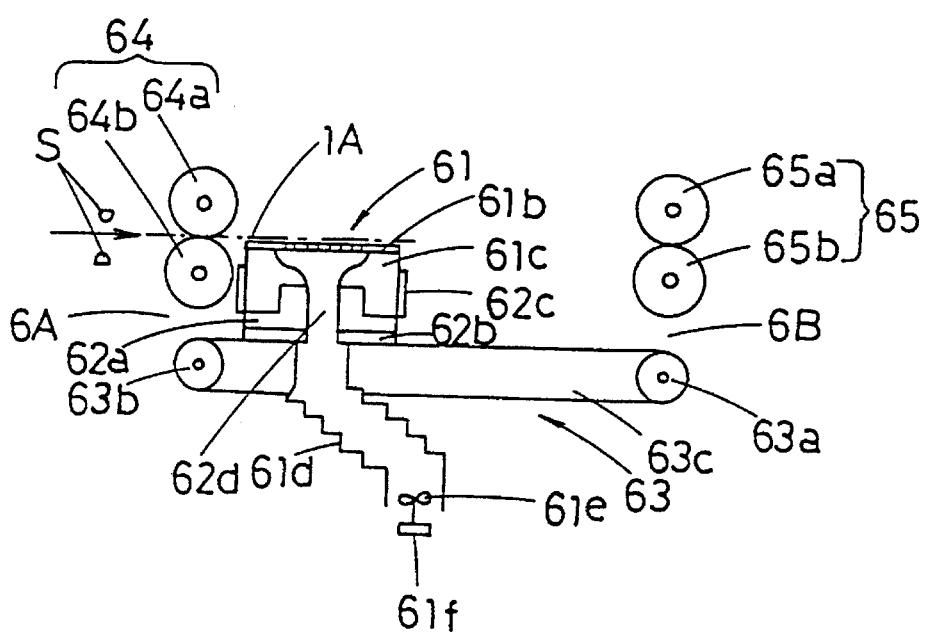
FIG. 22 through FIG. 24 are views for explaining the operation of the direction switching means of the same embodiment.

FIG. 21 is a plan view of the direction switching means 6 and FIG. 22 through FIG. 14 show the operation of the direction switching means 6.

The direction switching means 6 is constituted by suction means 61 for sucking and holding the sheet paper 1A, rotating means 62 for rotating the suction means 61 to change the direction of the sheet paper 1A at an angle of 90 degree and parallel-moving means 63 for moving the rotating means 62 from a receiving side 6A of the printed sheet paper 1A to a supplying side 6B to the developing unit 4.

The suction means 61 is constituted by mounting a suction plate 61b provided with a number of suction holes 61a to a suction head 62c which is mounted to an end portion of a suction duct 61d.

The suction duct 61d is constructed flexibly so as to follow displacement of the suction head 61c which reciprocates between the receiving side 6A and the supplying side 6B to be described later. At a base portion of the suction duct 61d, a motor 61f and a suction fan 61e fixed to a driving shaft of the motor 61f are disposed.

The parallel-moving means 63 is constituted by an endless belt 63c stretched between pulleys 63a, 63b positioned at the receiving side 6A and supplying side 6B.

The endless belt 63c is that, a driving motor 2M of the pulleys 63a, 63b is controlled by control means to be described later so that the suction duct 61d reciprocates between the receiving side 6A and supplying side 6B.

The rotating means 62 is that, the suction head 61c is rotated by a motor 1M controlled by control means to be described later. The suction head 61c is mounted rotatably on the upper surface of a rotating pedestal 62a and its rotating center coincides with the center of the rotating pedestal 62a.

Numeral 62b designates a mounting plate for mounting the rotating pedestal 62a onto the endless belt 63c, the rotating pedestal 62a is mounted on center of the mounting plate 62b, to one end of which the motor 1M is mounted and another end thereof is coupled to the endless belt 63c.

Numeral 62c designates a transmission belt stretched between the suction head 61c and a driving shaft of the motor 1M.

A through hole 62d is provided in the rotating pedestal 62a and mounting plate 62b, and the suction head 62c is connected to the suction duct 61d via the through hole 62d.

The direction switching means 6 includes, a pair of rollers 64 constituted by a driving roller 64b and a pressing roller 64a for receiving the sheet paper 1A from the printing unit 3, and a pair of rollers 65 constituted by a driving roller 65b and a pressing roller 65a for supplying the sheet paper 1A to the developing unit 4.

As control means for the direction switching means 6 constituted as above, either of the configurations of the control means shown in FIG. 9 or FIG. 14 is employed.

In FIG. 22, a symbol S designates a sensor for detecting front and rear ends of the sheet paper 1A.

Next, the rotating operation of the sheet paper 1A by the direction switching means 6 is described.

(1) First, when the printed sheet paper 1A is detected by the paper sensor S and the detecting means of the control means decides to change the direction of the sheet paper 1A, by controlling the rotating angle of the driving roller 64b, the sheet paper 1A is transferred by the pair of rollers 64 until its center coincides with the rotating center of the suction head 61c of the direction switching means 6.

At this time, the suction means 61 is positioned at the receiving side 6A (FIG. 22).

(2) Then, the sucking operation of the suction means 61 is started to suck the sheet paper 1A by the suction plate 61b.

(3) Next, the suction means 61 sucking and holding the sheet paper 1A is moved to the supplying side 6B by the endless belt 63c in synchronism with the transferring operation of the pair of rollers 64, 65.

Figure 23:
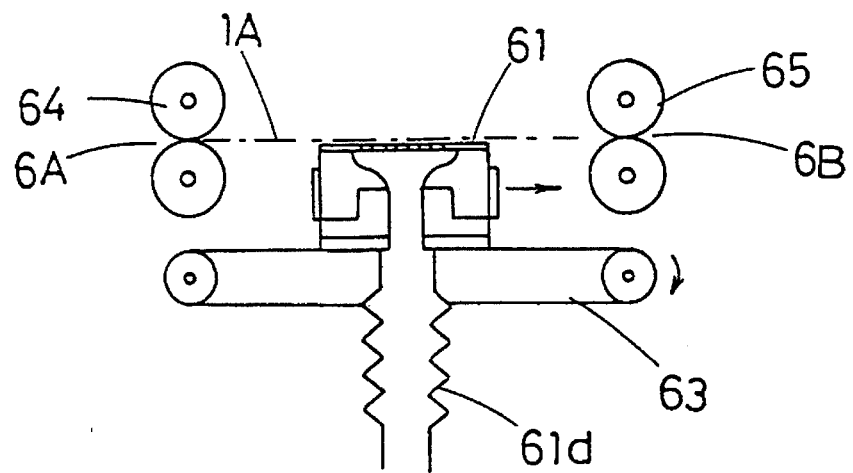

At the time point when the rear end of the sheet paper 1A comes off from the pair of rollers 64, whose transferring operation is stopped and the suction means 61 is rotated by the rotating means 62 (FIG. 23).

Figure 24:
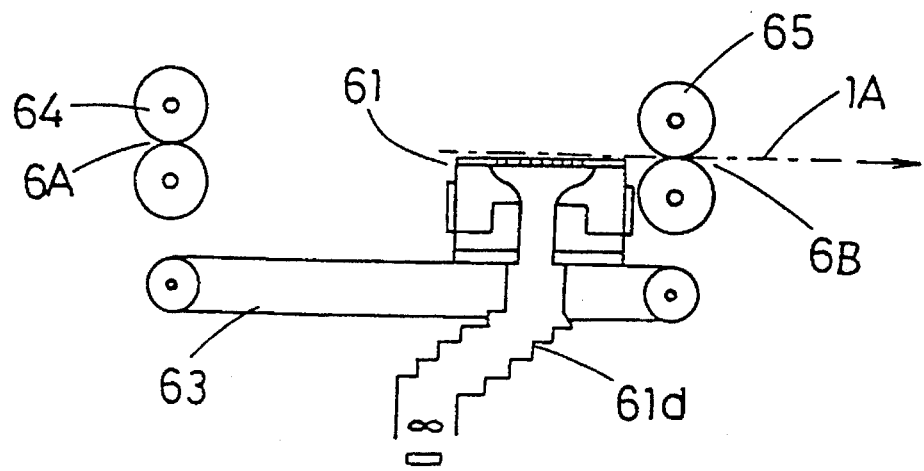

(4) Then, after moving the suction means 61 to the supplying side 6B and delivering the front end of the sheet paper 1A to the pair of rollers 65 on the supplying side 6B, the sucking operation is stopped and the sheet paper 1A is released from the suction means 61 and supplied to the developing unit by the pair of rollers 65 on the supplying side 6B (FIG. 24).

After supplying the sheet paper 1A to the developing unit, the suction means 61 is returned to the receiving side 6A.

When it is not necessary to change the direction, the sheet paper 1A is moved to the supplying side 6B and delivered to the pair of rollers 65 without rotating the sheet paper 1A sucked and held in the aforementioned manner.

Fourth Embodiment

Figure 25:
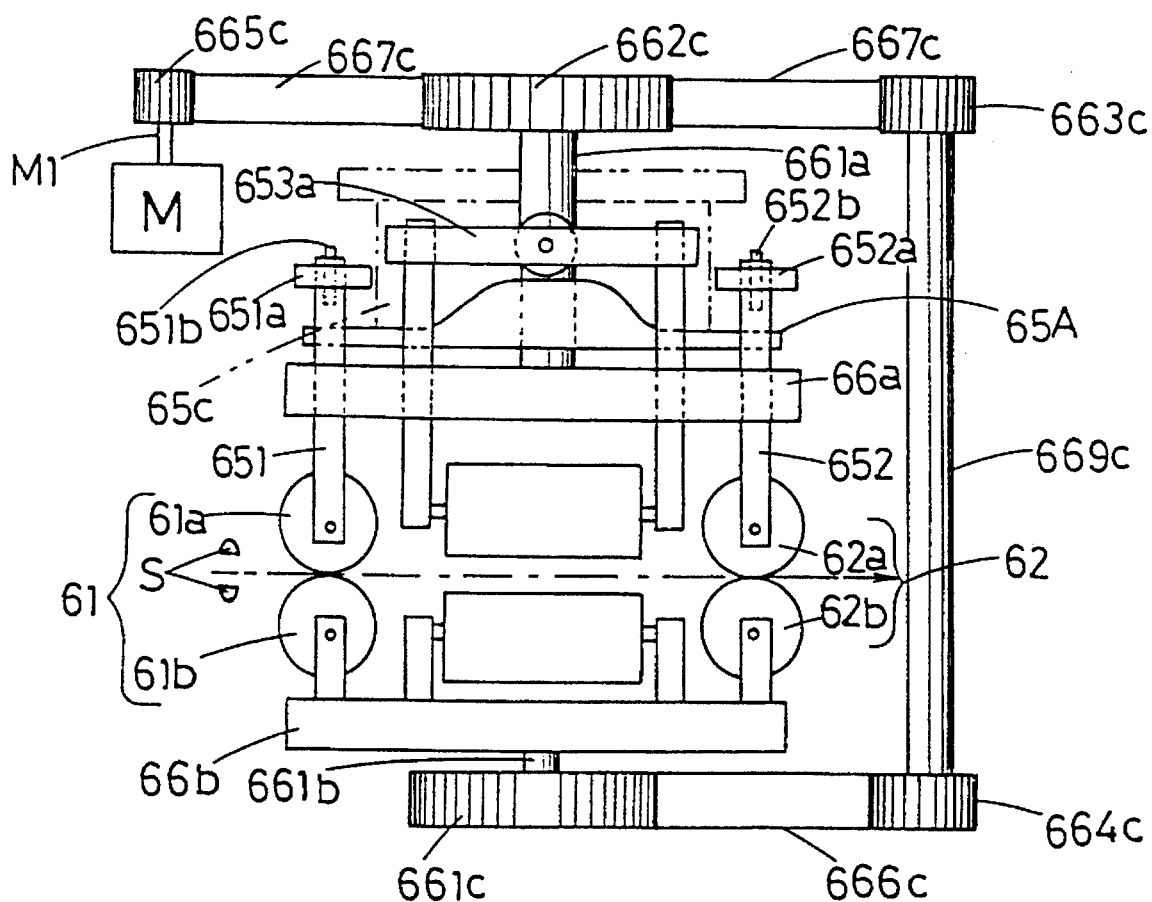
FIG. 25 is a front view showing a fourth embodiment of a photo-developing apparatus of the present invention.
Figure 26:
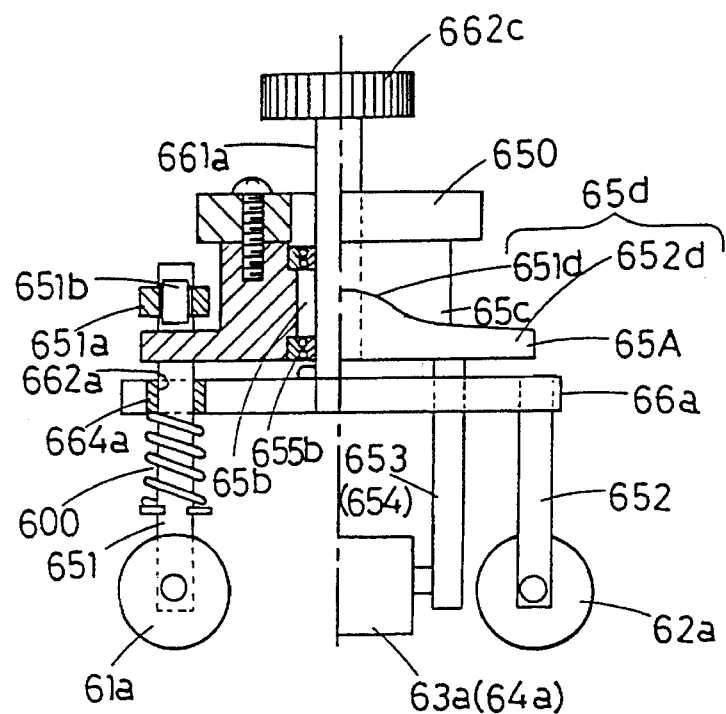
FIG. 26 is a front view showing an upper portion of direction switching means of the same embodiment.
Figure 27:
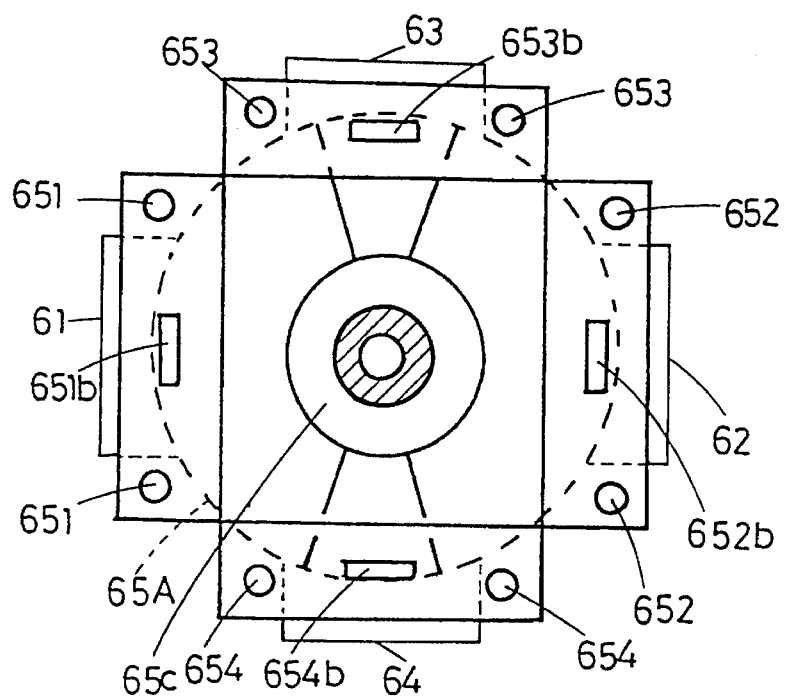
FIG. 27 is a plan view of the direction switching means of the same embodiment.
Figure 28A:
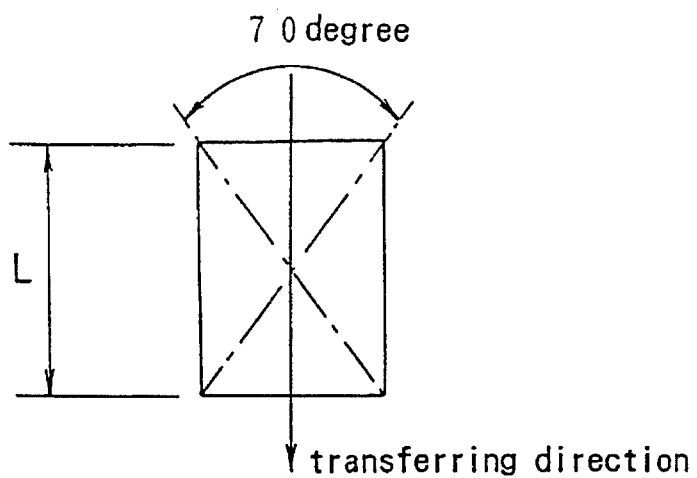
FIGS. 28A–28C is a plan view showing ranges of rotating angles of sheet paper.
Figure 28B:
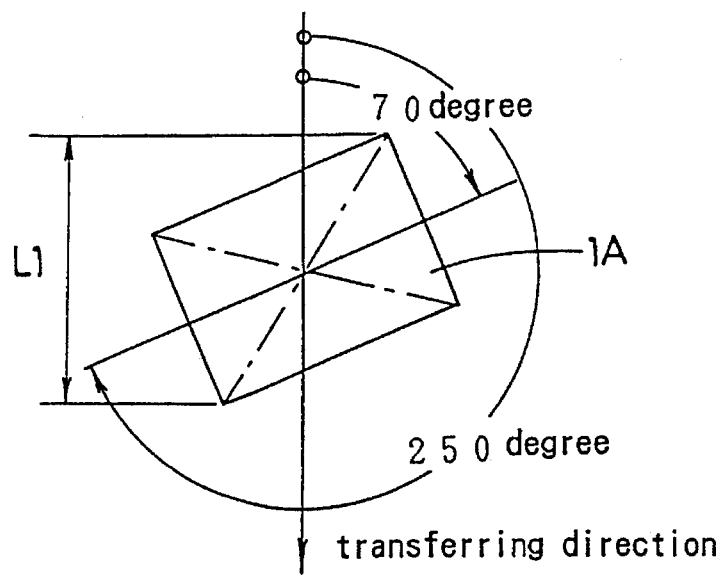
Figure 28C:
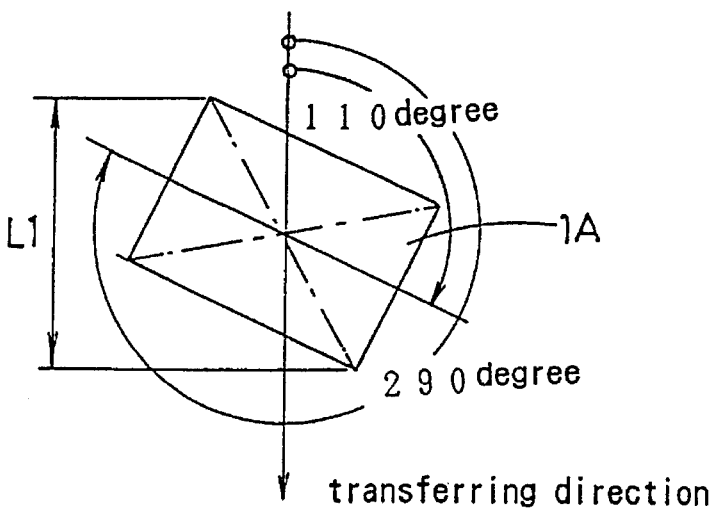

A photo-printing apparatus employs a same configuration as the first embodiment as to the magazine, printing unit and developing unit, and the direction switching means 6 disposed in a transfer passage 5 between the printing unit and developing unit is constituted as shown in FIG. 25 through FIG. 27. FIG. 25 is a front view of the direction switching means 6, FIG. 26 is a front view of an upper portion of the direction switching means 6 and FIG. 27 is a plan view of the direction switching means 6.

The direction switching means 6 is constituted by four pairs of rollers 61, 62, 63, 64 disposed, at an equal distance, around the rotating center of the sheet paper 1A, a cam mechanism 65 and roller rotating means 66.

Respective pair of rollers 61, 62, 63, 64 are constituted by pressing rollers 61a, 62a, 63a, 64a and driving rollers 61b, 62b, 63b, 64b facing one another and disposed on opposite sides of the transfer passage 5.

The driving rollers 61b to 64b are rotated by a same motor (not shown) at a same speed.

The roller rotating means 66 is constituted to rotate, by a rotating mechanism 66c at an angle of 90 degree, a pair of upper and lower rotating plates 66a, 66b facing one another and disposed on opposite sides of the transfer passage 5.

Rotating centers of the pair of upper and lower rotating plates 66a, 66b are positioned on a same vertical line.

On an upper face center of the upper rotating plate 66a, a rotating shaft 661a born by bearings (not shown) is mounted, and four pairs of shaft through holes 662a are provided, at an equal distance, around the upper rotating plate 66a, slide bearings 664a being fixed to the shaft through holes 662a.

On a lower face center of the lower rotating plate 66b, a rotating shaft 661b born by bearings (not shown) is mounted, and the driving rollers 61b to 64b are mounted, at an equal distance, around the lower rotating plate 66b.

The rotating mechanism 66c is constituted by grooved pulleys 661c, 662c fixed to the rotating shafts 661a, 661b, intermediate pulleys 663c, 664c, a driving pulley 665c and belts 666c, 667c stretched between these pulleys, the driving pulley 665c being fixed to a driving shaft M1 of a motor M and the intermediate pulleys 663c, 664c being fixed to opposite ends of a rotating shaft 669c born by bearings (not shown).

The cam mechanism 65 is constituted by four pairs of driven shafts 651, 652, 653, 654 and a cam 65A.

Between lower ends of respective pair of driven shafts 651 to 654, pressing rollers 61a to 64a are mounted rotatably, between upper ends of respective pair of driven shafts 651 to 654 are connected by connecting members 651a to 654a on intermediate portions of which rollers 651b to 654b are mounted.

The respective pair of driven shafts 651 to 654 are inserted slidably through holes 662a of the upper rotating plate 66a of the roller rotating means 66, the driven shafts 651 to 654 being urged downward by springs 600.

A cam body 65a of the cam 65A is formed into a disk shape and a through hole 65b is formed in the center of the cam body 65a, a boss portion 65c being provided around the through holes 65b. Bearings 655b are fixed to the through hole 65b.

The rotating shaft 661a of the upper rotating plate 66a is inserted through the through hole 65b of the cam 65A.

A cam face 65d is formed on the upper face of the cam body 65a, the cam face 65d being formed by a pair of narrow projection faces 651d and a pair of wide flat faces 652d, which are provided, at an equal distance, around the cam body 65a.

The boss portion 65c of the cam 65A is fixed to a cam support frame 650.

The cam 65A constituted in such a manner is disposed between the upper rotating plate 66a and the connecting members 651a to 653a of the driven shafts 651 to 654.

By urging the driven shafts 61 to 654 downward by the springs, their rollers 651b to 654b contact to the cam face 65d of the cam 65A elastically.

Accordingly, when the pair of upper and lower rotating plates 66a, 66b are rotated, the rollers 651b to 654b move up and down along the projection face 651d and flat face 652d of the cam face 65d to ascend and descend the pressing rollers 61a, 62a, 63a, 64a.

When the rollers 651b to 654b are positioned at the flat face 652d, the pressing rollers 61a to 64a are operated for pressing and when the rollers 651b to 654b are positioned at the projection face 651d, the pressing rollers 61a to 64a are released from the pressing operation.

As to the control means, either of the configurations of the control means shown in FIG. 9 or FIG. 14 is employed.

In FIG. 25, a symbol 5 designates a sensor for detecting front and rear of the sheet paper 1A.

Next, the rotating operation of the direction switching means 6 is described.

(1) First, when the printed sheet paper 1A is detected by the paper sensor 5 and the detecting means of the control means decides to change the direction of the sheet paper 1A, after transferring the sheet paper 1A by the pair of rollers 61, 62 until its center coincides with the rotating center of the pair of upper and lower rotating plates 66a, 66b of the direction switching means 6 by controlling the rotating angle of the driving roller 61b, which are stopped to rotate.

When receiving the sheet paper 1A, the pressing rollers 61a, 62a positioned on the center line of the transfer passage 5 are pressed onto the driving rollers 61b, 62b, and the pressing rollers 63a, 64a positioned at opposite sides of the transfer passage 5 are released.

(2) When the motor M is driven by an actuation instruction signal by the detecting means 7A of the control means 7, the pair of upper and lower rotating plates 66a, 66b are rotated at an angle of 90 degree to change the direction of the sheet paper 1A at an angle of 90 degree.

At the stage of starting the rotation of the rotating plates 66a, 66b, the sheet paper 1A is pressed and clamped by only two pairs of rollers 61, 62, and after the rotation or immediately before finishing the rotation, the sheet paper 1A is pressed and clamped by only two pairs of rollers 63, 64, in other cases during the rotation, it is pressed and clamped by the four pairs of rollers 61, 62, 63, 64.

(3) After changing the direction of the sheet paper 1A in such a manner, the sheet paper 1A is supplied to the developing unit 4 by the two pairs of rollers 63, 64.

(4) After rotating the sheet paper 1A at an angle of 90 degree and supplying it to the developing unit 4, the following sheet paper 1A is received in this state.

When it is not necessary to change the direction, the roller rotating means 66 is not actuated and the sheet paper 1A is supplied to the developing unit 4 by the pair of rollers 61, 62.

In the aforementioned first to fourth embodiments, though the direction switching means 6 whose direction switching angle of the sheet paper 1A is set at 90 degree is used, when a length L1 between the front and rear ends of the sheet paper 1A is shorter that a length L of a long-side direction of the sheet paper 1A, a direction switching angle to be set is not restricted particularly.

That is, for L-size sheet paper 1A, L1<L is obtained when the direction switching angle is set within the range from 70 degree to 110 degree, and also L1<L is obtained when setting within the range from 250 degree to 290 degree (FIG. 22 (B), (C)).

For E-size and 4×6 inch-size sheet papers, L1<L is obtained by setting the direction switching angle approximately within the same range.

The direction of the sheet paper 1A is changed within these ranges in such a manner that, for example, the photodeveloping apparatus of the third embodiment is used and the rotating angle of the suction head 61c of the rotating means 62 of the apparatus is set to any angle within such ranges.

We claim:

1. A photo-developing apparatus cutting a rolled-paper pulled out from a magazine into a desired length of sheet paper, printing the sheet paper in a printing unit and developing the sheet paper in a developing unit, comprising:

direction switching means in a transfer passage shifting the sheet paper to the developing unit from the printing unit, the direction switching means being disposed for rotating the sheet paper sent from the printing unit to change its direction within the range from 70 degree to 110 degree or from 250 degree to 290 degree.

2. A photo-developing apparatus in claim 1, comprising control means for judging whether or not to actuate the direction switching means depending upon sizes of a sheet paper.

3. A photo-developing apparatus in claim 2, wherein the control means controls the direction switching means so as to transfer a sheet paper of panoramic size with its long-side direction directing to the transferring direction without actuating the direction switching means.

4. A photo-developing apparatus in claim 2, wherein the control means comprises, detecting means for detecting the sheet paper size, and judging means for judging a detecting signal outputted from the detecting means to output a control signal to the direction switching means.

5. A photo-developing apparatus in claim 3, wherein the control means comprises, detecting means for detecting the sheet paper size, and judging means for judging a detecting signal outputted from the detecting means to output a control signal to the direction switching means.

6. A photo-developing apparatus in claim 2, wherein the control means comprises, a memory for storing a cutting size instruction signal of the rolled paper as size information, and judging means for judging the size information outputted from the memory to output a control signal to the direction switching means.

7. A photo-developing apparatus in claim 3, wherein the control means comprises, a memory for storing a cutting size instruction signal of the rolled paper as size information, and judging means for judging the size information outputted from the memory to output a control signal to the direction switching means.

8. A photo-developing apparatus in claim 1, wherein the direction switching means comprises, a pair of upper and lower rotating disks pressing and clamping the sheet paper therebetween, rotating means for rotating the pair of upper and lower rotating disks to change the direction of sheet paper and means for releasing the transferring means during the rotation.

9. A photo-developing apparatus in claim 2, wherein the direction switching means comprises, a pair of upper and lower rotating disks pressing and clamping the sheet paper therebetween, rotating means for rotating the pair of upper and lower rotating disks to change the direction of sheet paper and means for releasing the transferring means during the rotation.

10. A photo-developing apparatus in claim 3, wherein the direction switching means comprises, a pair of upper and lower rotating disks pressing and clamping the sheet paper therebetween, rotating means for rotating the pair of upper and lower rotating disks to change the direction of sheet paper and means for releasing the transferring means during the rotation.

11. A photo-developing apparatus in claim 4, wherein the direction switching means comprises, a pair of upper and lower rotating disks pressing and clamping the sheet paper therebetween, rotating means for rotating the pair of upper and lower rotating disks to change the direction of sheet paper and means for releasing the transferring means during the rotation.

12. A photo-developing apparatus in claim 5, wherein the direction switching means comprises, a pair of upper and lower rotating disks pressing and clamping the sheet paper therebetween, rotating means for rotating the pair of upper and lower rotating disks to change the direction of sheet paper and means for releasing the transferring means during the rotation.

13. A photo-developing apparatus in claim 6, wherein the direction switching means comprises, a pair of upper and lower rotating disks pressing and clamping the sheet paper therebetween, rotating means for rotating the pair of upper and lower rotating disks to change the direction of sheet paper and means for releasing the transferring means during the rotation.

14. A photo-developing apparatus in claim 7, wherein the direction switching means comprises, a pair of upper and lower rotating disks pressing and clamping the sheet paper therebetween, rotating means for rotating the pair of upper and lower rotating disks to change the direction of sheet paper and means for releasing the transferring means during the rotation.

15. A photo-developing apparatus in claim 1, wherein the direction switching means comprises, suction means for sucking the sheet paper, rotating means for rotating the suction means to change the direction of sheet paper and means for transferring the sheet paper together with the suction means and the rotating means.

16. A photo-developing apparatus in claim 2, wherein the direction switching means comprises, suction means for sucking the sheet paper, rotating means for rotating the suction means to change the direction of sheet paper and means for transferring the sheet paper together with the suction means and the rotating means.

17. A photo-developing apparatus in claim 3, wherein the direction switching means comprises, suction means for sucking the sheet paper, rotating means for rotating the suction means to change the direction of sheet paper and means for transferring the sheet paper together with the suction means and the rotating means.

18. A photo-developing apparatus in claim 4, wherein the direction switching means comprises, suction means for sucking the sheet paper, rotating means for rotating the suction means to change the direction of sheet paper and means for transferring the sheet paper together with the suction means and the rotating means.

19. A photo-developing apparatus in claim 5, wherein the direction switching means comprises, suction means for sucking the sheet paper, rotating means for rotating the suction means to change the direction of sheet paper and means for transferring the sheet paper together with the suction means and the rotating means.

20. A photo-developing apparatus in claim 6, wherein the direction switching means comprises, suction means for sucking the sheet paper, rotating means for rotating the suction means to change the direction of sheet paper and means for transferring the sheet paper together with the suction means and the rotating means.

21. A photo-developing apparatus in claim 7, wherein the direction switching means comprises, suction means for sucking the sheet paper, rotating means for rotating the suction means to change the direction of sheet paper and means for transferring the sheet paper together with the suction means and the rotating means.

22. A photo-developing apparatus in claim 1, wherein the direction switching means comprises, a pair of upper and lower driving and pressing rollers which transfer the sheet paper, and rotating means for rotating the pair of upper and lower driving and pressing rollers to change the direction of sheet paper.

23. A photo-developing apparatus in claim 2, wherein the direction switching means comprises, a pair of upper and lower driving and pressing rollers which transfer the sheet paper, and rotating means for rotating the pair of upper and lower driving and pressing rollers to change the direction of sheet paper.

24. A photo-developing apparatus in claim 3, wherein the direction switching means comprises, a pair of upper and lower driving and pressing rollers which transfer the sheet paper, and rotating means for rotating the pair of upper and lower driving and pressing rollers to change the direction of sheet paper.

25. A photo-developing apparatus in claim 4, wherein the direction switching means comprises, a pair of upper and lower driving and pressing rollers which transfer the sheet paper, and rotating means for rotating the pair of upper and lower driving and pressing rollers to change the direction of sheet paper.

26. A photo-developing apparatus in claim 5, wherein the direction switching means comprises, a pair of upper and lower driving and pressing rollers which transfer the sheet paper, and rotating means for rotating the pair of upper and lower driving and pressing rollers to change the direction of sheet paper.

27. A photo-developing apparatus in claim 6, wherein the direction switching means comprises, a pair of upper and lower driving and pressing rollers which transfer the sheet paper, and rotating means for rotating the pair of upper and lower driving and pressing rollers to change the direction of sheet paper.

28. A photo-developing apparatus in claim 7, wherein the direction switching means comprises, a pair of upper and lower driving and pressing rollers which transfer the sheet paper, and rotating means for rotating the pair of upper and lower driving and pressing rollers to change the direction of sheet paper.

\* \* \* \* \*